Aug. 6, 1935.  J. V. MARTIN  2,010,368
AUTOMOBILE
Filed April 17, 1929    13 Sheets-Sheet 1
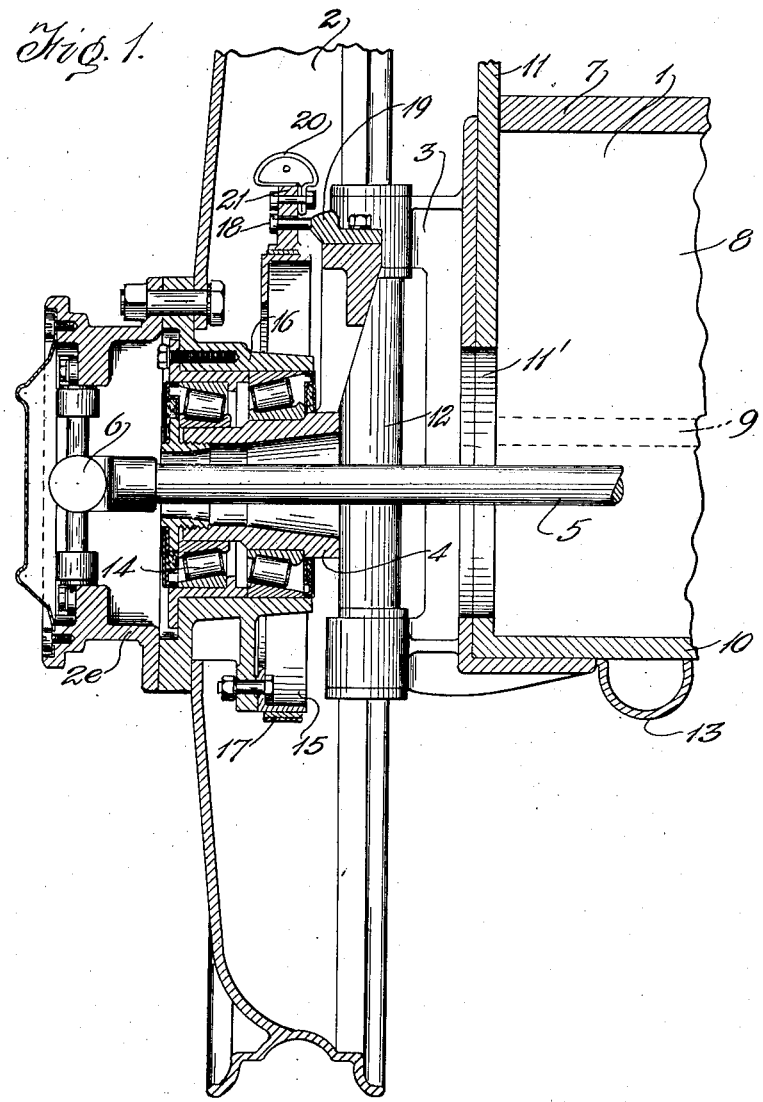

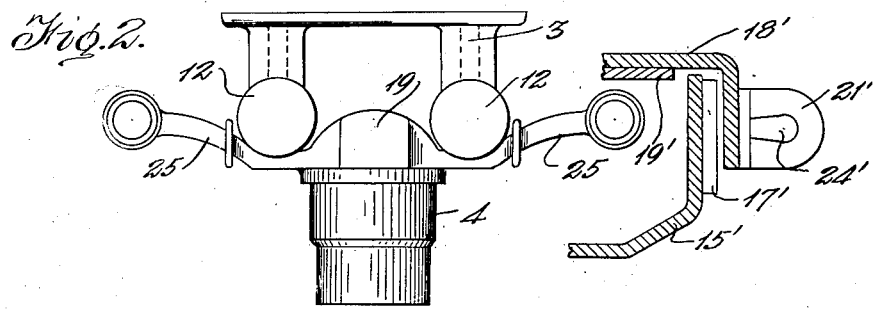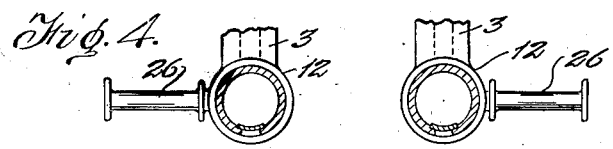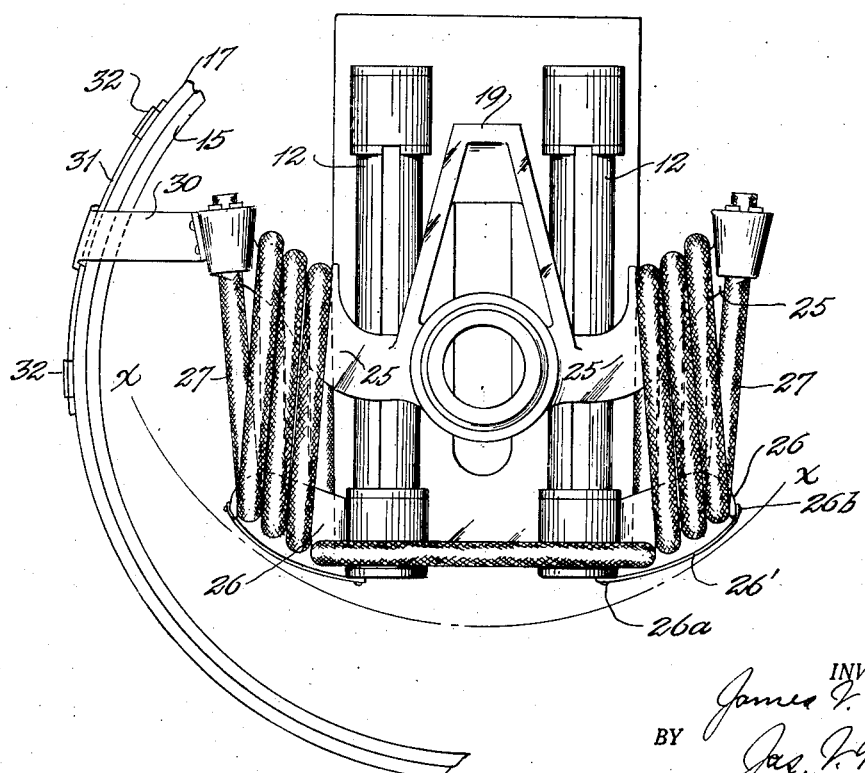

Aug. 6, 1935.  J. V. MARTIN  2,010,368
AUTOMOBILE
Filed April 17, 1929  13 Sheets-Sheet 3

INVENTOR.
James V. Martin
BY
Jas. V. Martin
ATTORNEY

Aug. 6, 1935.　　　　J. V. MARTIN　　　　2,010,368
AUTOMOBILE
Filed April 17, 1929　　13 Sheets-Sheet 4

INVENTOR.
James V. Martin
BY Jas. V. Martin
ATTORNEY

Aug. 6, 1935.  J. V. MARTIN  2,010,368
AUTOMOBILE
Filed April 17, 1929   13 Sheets-Sheet 5
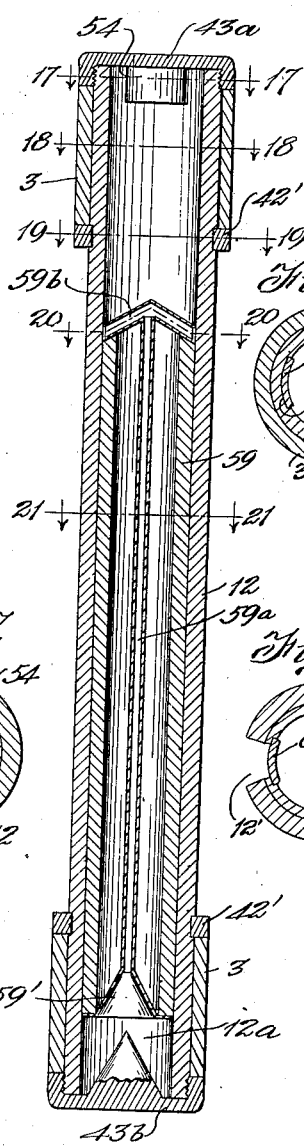
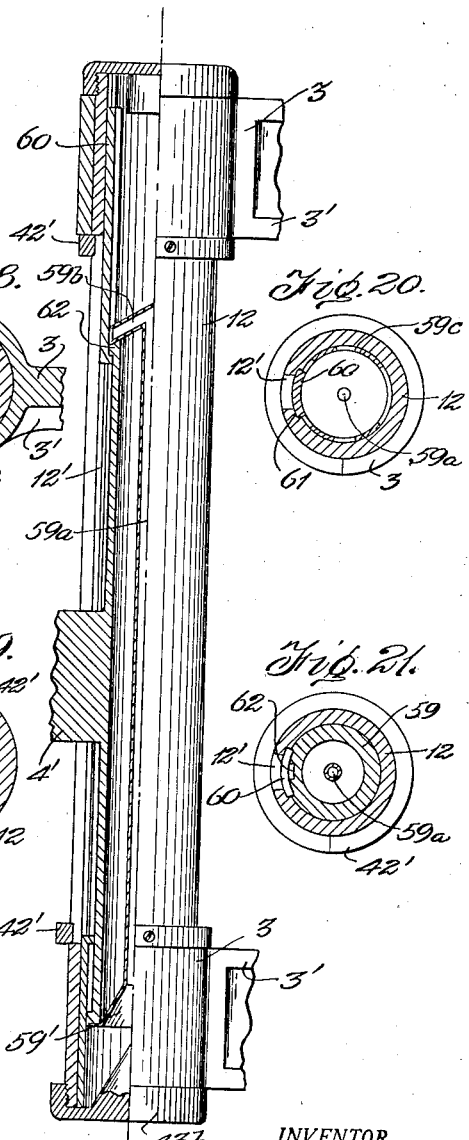
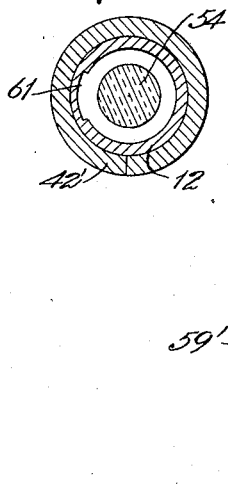
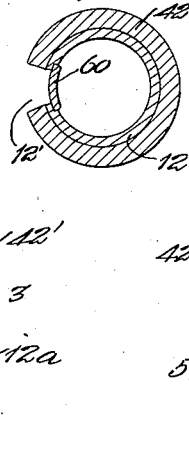
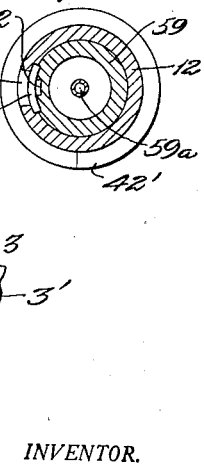
INVENTOR.
*James V. Martin*
*Jas. V. Martin*
ATTORNEY

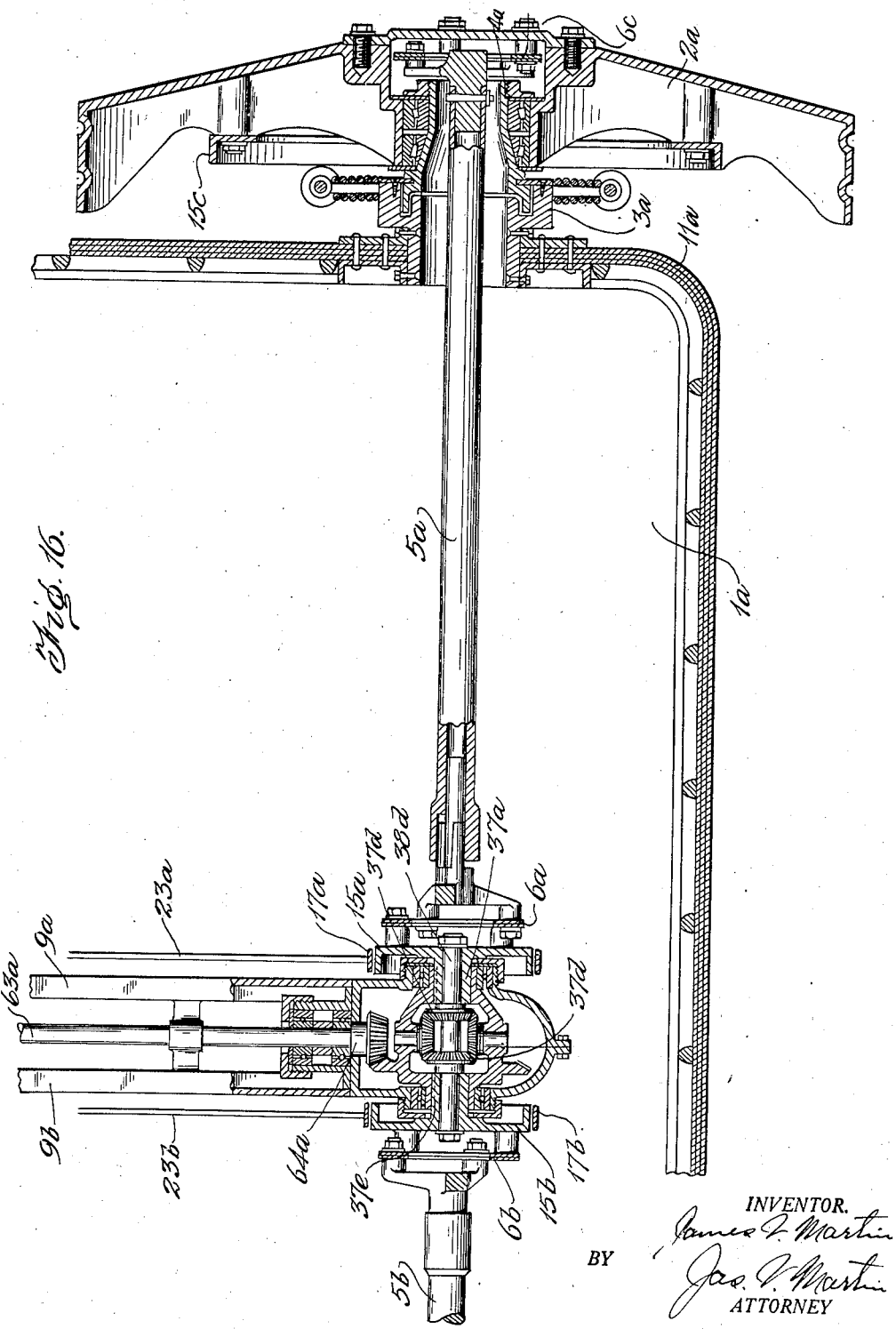

Aug. 6, 1935.          J. V. MARTIN          2,010,368
                        AUTOMOBILE
                    Filed April 17, 1929      13 Sheets-Sheet 7
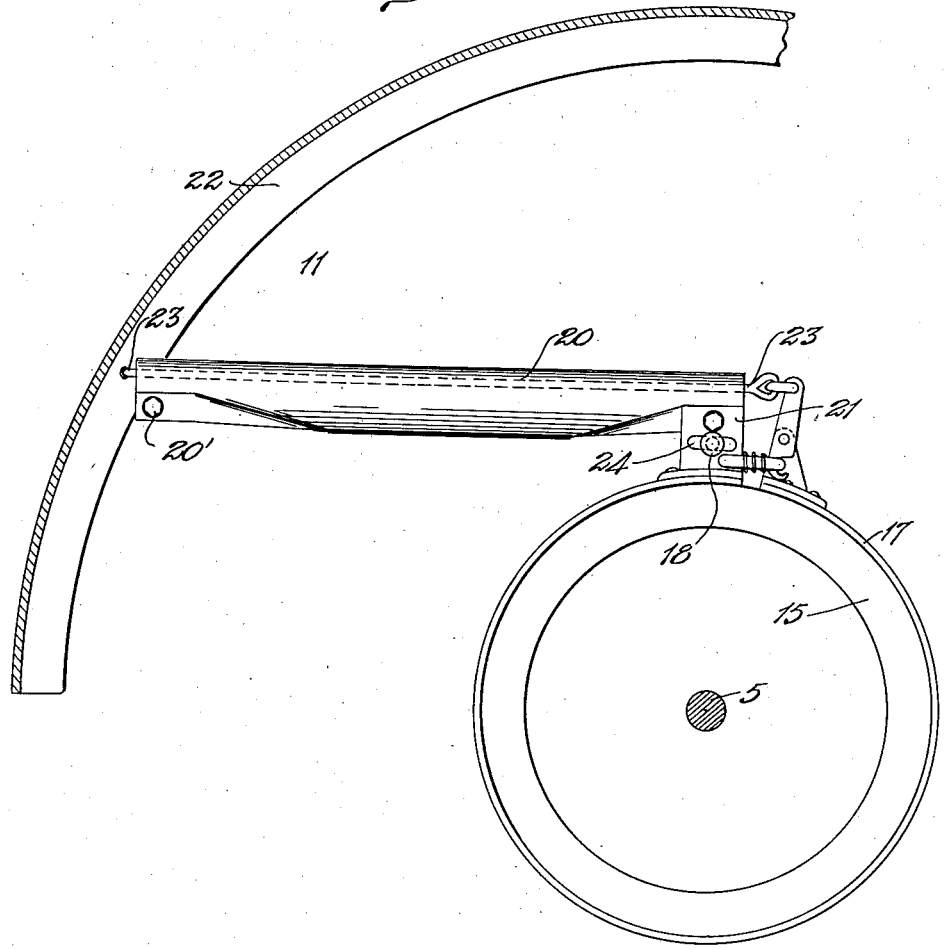
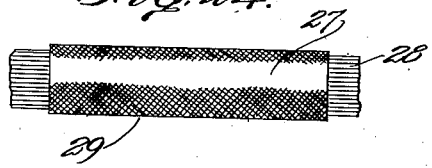
INVENTOR.
James V. Martin
BY
Jas. V. Martin
ATTORNEY Aug. 6, 1935.   J. V. MARTIN   2,010,368
AUTOMOBILE
Filed April 17, 1929   13 Sheets-Sheet 8

INVENTOR.
James V. Martin
BY Jas. V. Martin
ATTORNEY

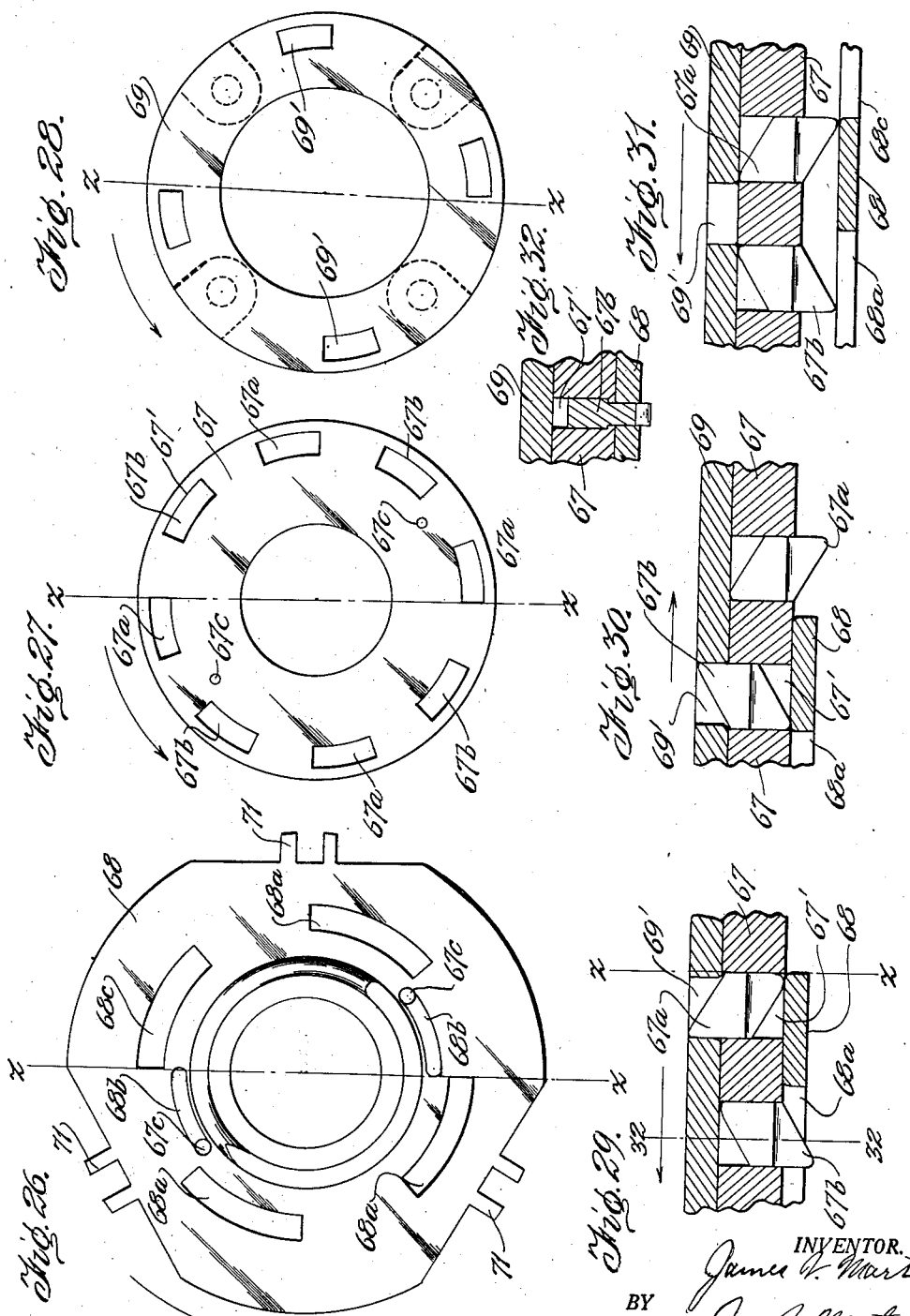

Aug. 6, 1935.     J. V. MARTIN     2,010,368
AUTOMOBILE
Filed April 17, 1929    13 Sheets-Sheet 10
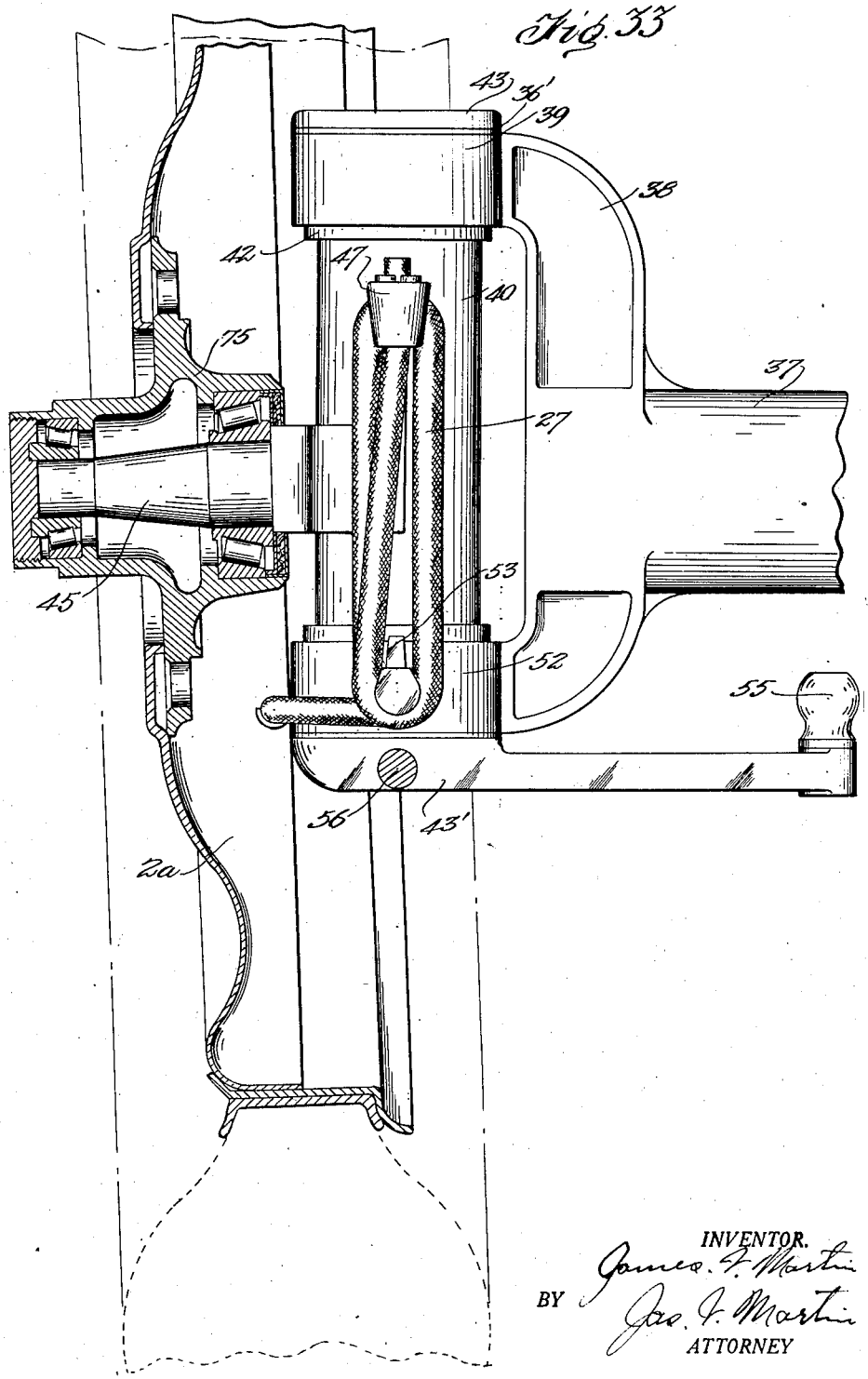
INVENTOR.
James F. Martin
BY  Jas. F. Martin
ATTORNEY Aug. 6, 1935.    J. V. MARTIN    2,010,368
AUTOMOBILE
Filed April 17, 1929    13 Sheets-Sheet 11

INVENTOR.
James V. Martin
BY
Jas. V. Martin
ATTORNEY

Aug. 6, 1935.  J. V. MARTIN  2,010,368
AUTOMOBILE
Filed April 17, 1929  13 Sheets-Sheet 12
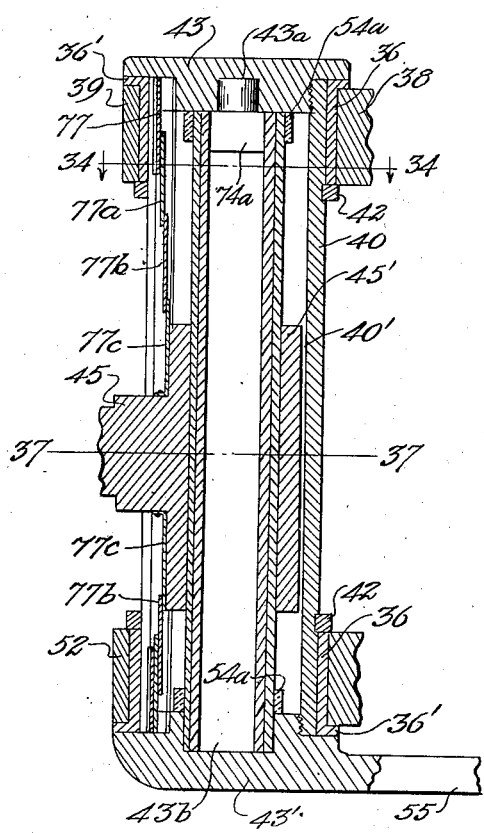
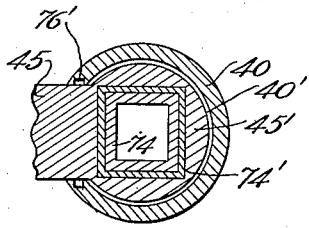
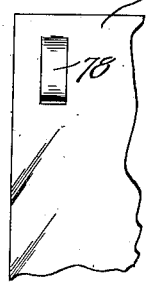
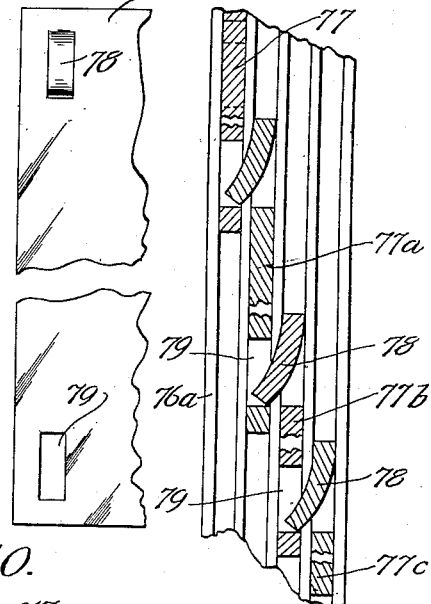
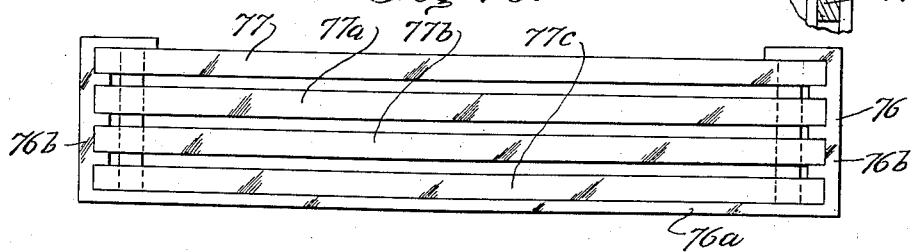
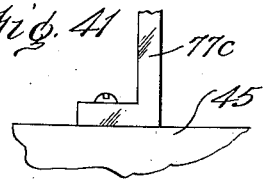
INVENTOR.
James V. Martin
BY Jas. V. Martin
ATTORNEY Aug. 6, 1935.   J. V. MARTIN   2,010,368
AUTOMOBILE
Filed April 17, 1929   13 Sheets-Sheet 13
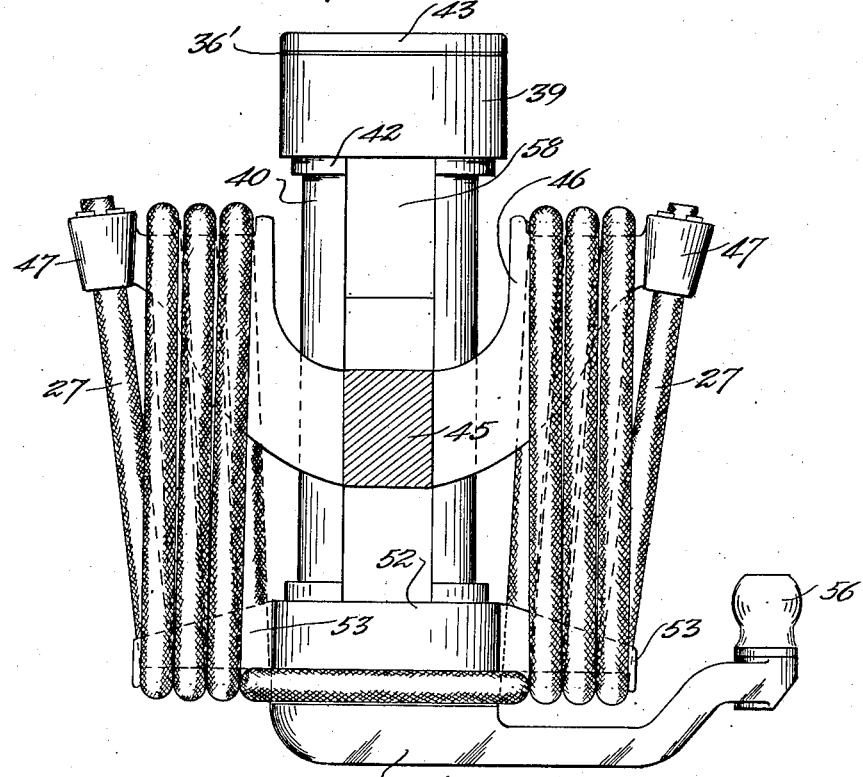
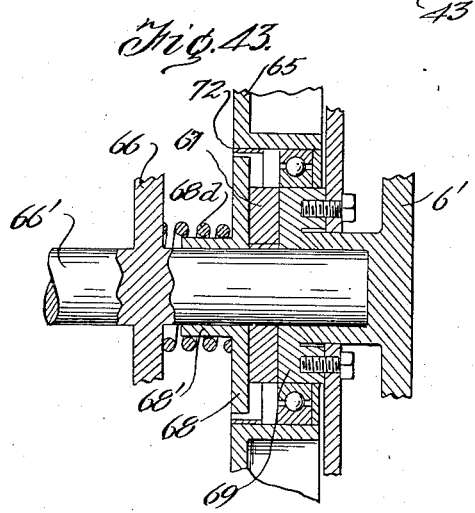
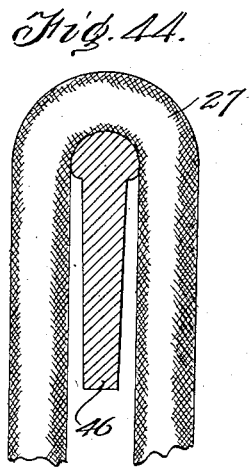
INVENTOR.
James V. Martin
BY Jas. V. Martin
ATTORNEY Patented Aug. 6, 1935

2,010,368

UNITED STATES PATENT OFFICE 2,010,368

AUTOMOBILE

James V. Martin, Garden City, N. Y.

Application April 17, 1929, Serial No. 355,839

19 Claims. (Cl. 280—96.2)

My invention relates to improved forms of road vehicle construction and is particularly adapted to automobiles, trailers and aeroplanes.

The primary object of my invention is to effect economies in auto weight, bulk and complication while improving riding qualities along the lines disclosed in my former Patents Nos. 1,432,771—1,471,968—1,546,500—1,682,297 and in my copending applications Nos. 65,596 filed Oct. 29, 1925—91,130 filed Feb. 27, 1926 and 165,373 filed Feb. 2nd, 1927, the latter issuing as Patent No. 1,712,151.

For many years past the value of springing the unsprung weight of road vehicles has been recognized by most automobile designers and the prior art is fairly full of attempts to accomplish this object in a practical manner, but certain rather fundamental difficulties have been so insistent as to nullify all efforts in this direction so that practically none of our present day road vehicles have sprung axles, sprung rear end drives or sprung tie rods: It appears necessary to have some means of holding an auto drive wheel securely in a given plane of rotation while allowing it to move resiliently over the uneven portions of the road; if this is accomplished by means of tie rods, axles or cross leaf type springs the weight of these is unsprung and space must be provided for them between the road clearance and the body which contains persons or goods, also space for the resilient movement of these parts relative to the body.

If each wheel is individually sprung upon a guide bracket adjacent to it, several difficulties ensue; the wheel must be held in its plane of rotation relative to the other wheels and the body, the guides to be practical, must be entirely inclosed to protect them from dirt and a means of braking the wheel must be found which does not cramp the guides: It is with these and kindred problems that the present invention is concerned and the further objects of the invention will be disclosed as we proceed to review the drawings and descriptions which follow:—

Figure 1 is a rear elevation, mostly in section, of my invention applied to the rear left wheel of a typical automobile.

Figure 2 is a view looking down upon the bracket, guide and stub axle which intervene between the body and wheel shown in Fig. 1, part of the braking mechanism is also shown, but revolved through a quadrant from its normal position, Fig. 3 is a view of these parts looking at them from the outside with the wheel removed and Fig. 4 is a view looking upwardly under the guides and shock absorber arms, part of the guides being in section.

Figure 5 shows a form of universal joint especially suited to the form of independently sprung wheel disclosed in Fig. 1, while Fig. 6 is a section of the said joint taken along the line 6—6 of Fig. 5, and Fig. 7 is an enlarged section of the drive shaft connection to the said joint showing how the special oil impregnated bushings are protected from dirt. Fig. 8 shows the off-set attachment of the said joint to the wheel hub cap affording end play to the drive shaft.

Fig. 9 shows a view of my invention applied to the front left steering wheel of a vehicle, seen from the rear, while Fig. 10 shows the same guide bracket seen from the wheel side and Fig. 11 is the same guide bracket and wheel spindle seen from above. Fig. 12 is an enlarged view of the spindle and the internally disposed guide, the latter and its retaining tube and closing plate being shown in section and Fig. 13 shows in section the top of the guide retaining bearings and bracket walls.

Fig. 14 shows a typical rear bracket guide in section while Fig. 15 shows partly in section the same guide looking at it from the left rear end of the vehicle.

Fig. 16 is an identical reproduction of Fig. 7 of my copending application Serial No. 65,596 filed Oct. 29, 1925, with the exception that the short shaft which connects the differential gears to the universal joints is carried through from one joint to the other on the same principle as that employed in my Patent No. 1,682,297.

Fig. 17 is a section of the guide top cap taken on lines 17—17 of Fig. 14 and Figs. 18, 19, 20 and 21 are sections taken upon lines corresponding to their numbers on Fig. 14.

Fig. 22 is a view of the left rear wheel housing and braking mechanism, seen from the wheel side.

Fig. 23 is a cross section of the form of rubber shock absorber I employ in place of steel springs for the vehicle suspension, and Fig. 24 is a side view of the same cord showing the rubber bands held in initial tension by the web of their covering.

Figure 25:
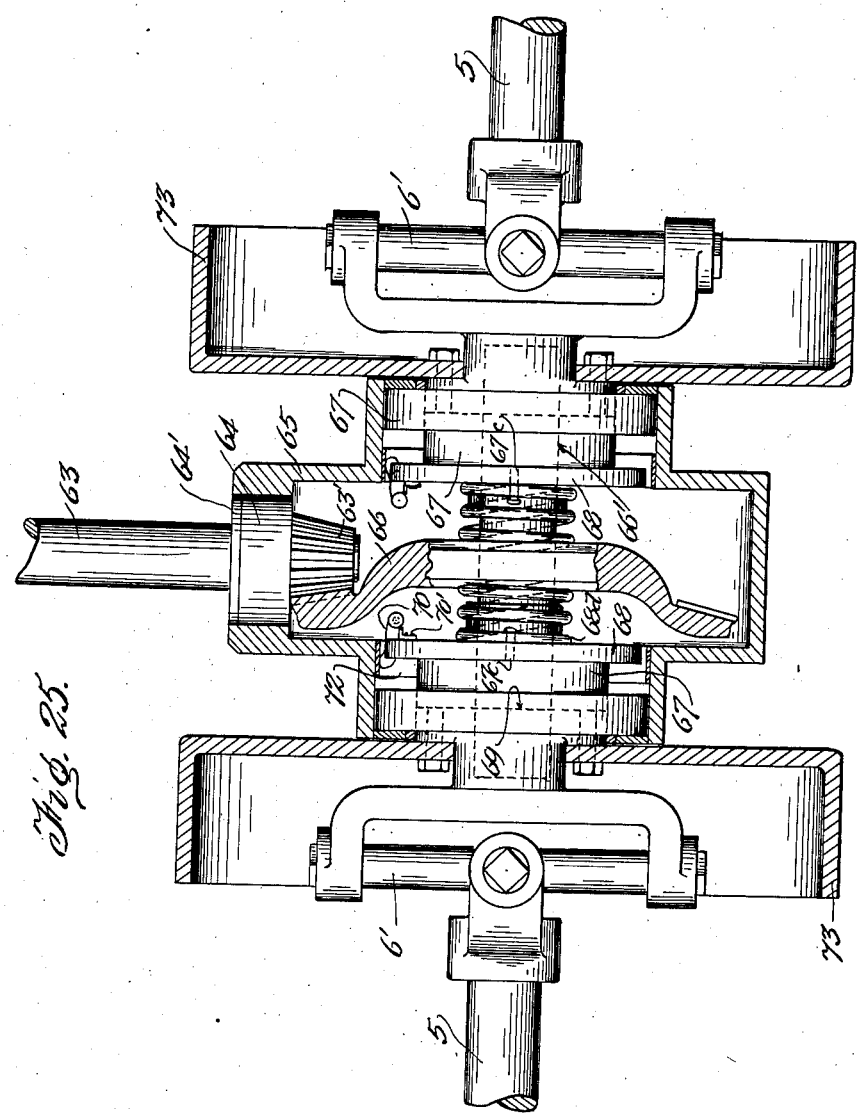

Fig. 25 is a plan view of my rear end drive which replaces the conventional differential, while Figs. 26, 27, 28 are respectively the tooth engager wheel, the driving tooth wheel and the driven tooth wheel of the said rear end drive and Figs. 29, 30 and 31 show in section the principle of operation of the sliding teeth which engage the said wheels in different positions of operation, while Fig. 32 is a section taken along the line 32—32 of Fig. 29.

Figure 34:
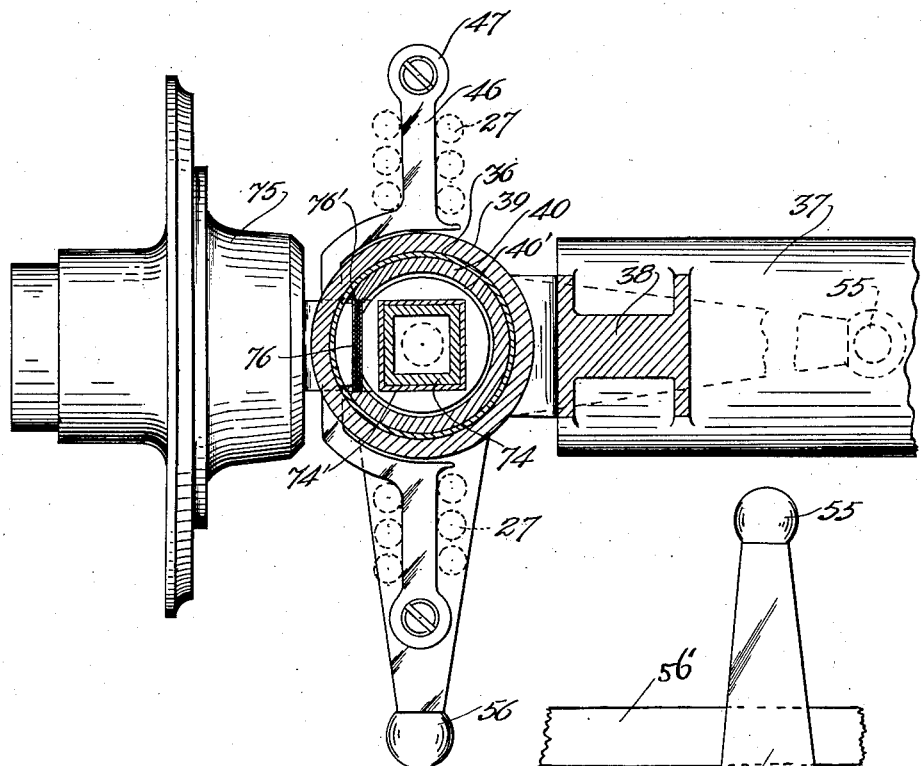
Figure 35:
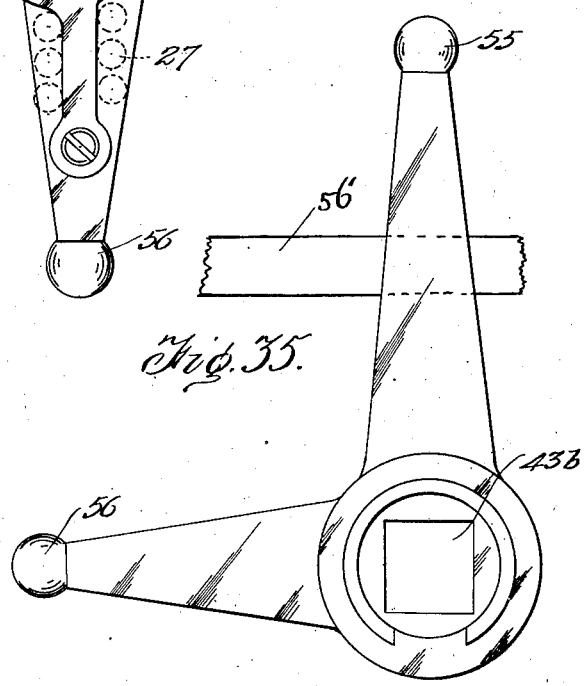

Fig. 33 is an alternative application of my invention to a left side steering wheel. Fig. 34 is a view looking down upon the invention disclosed in Fig. 33 with the guide portions in section, while Fig. 35 shows my novel steering and tie rod arms. Fig. 36 is a section in elevation through the center of the guides shown in Fig. 33, and Fig. 37 is a section taken on line 37—37 of Fig. 36. Fig. 38 shows the slots and lips in the small plates which close the guides against ingress of dirt and Figs. 39 and 40 show respectively the side elevation in section of these plates and the upper end plan view of the plates in a case, while Fig. 41 shows the way one plate in each case is attached to the steering spindle or stub axle. The views of these plates are greatly magnified.

Fig. 42 shows the steering shock absorber of Fig. 33 seen from the wheel side, the wheel being removed and the spindle attachment in section. Fig. 43 is a view mostly in section of the rear drive parts shown in Fig. 25. Fig. 44 shows in section a typical form of the arm which holds the rubber cord shock absorbers or bands.

Taking up the detailed description and using similar reference characters to designate similar parts throughout the several views 1 denotes the lower portion of an automobile body, which in my construction is so much lowered over conventional practice that it occupies the same relative space used for the lower parts of auto chassis, such as the springs and the axles etc. 2 is an outwardly dished disc type wheel held unyieldingly in its plane of rotation by the guide bracket 3 which connects it with the body so that the hollow stub axle 4 is guided vertically relative the said body, and the wheel 2 is driven through the universal joint 6, located within the hub cap 2e, by the drive shaft 5. In place of the usual chassis frame I employ the reinforced body lower portion to support the rear drive and to hold the wheel alignment directly through the guide brackets 3. These are secured to the body side walls 11 where (see Fig. 1) the side wall is braced by the body rear seat indicated at 7 and by a transverse forward support for the seat 8 and by the body floor indicated by dotted lines at 9, thus forming with a bottom cover 10 a completely inclosed box-like section of the body which supports and houses the rear drive and allows the drive shafts 5 to pass through an aperture 11' in the side 11 and between the vertical guides 12 and then through the hollow stub axle 4 to the joint 6.

The extreme bottom of the body extends uninterruptedly from the rear back wall past the motor to a position forward of the centers of the front steering wheels 2a and has under it two or more skids, one being indicated in section at 13 of Fig. 1; these run fore and aft and are designed to save the body bottom from wear should rocks or ruts strike the bottom. Roller bearings 14 support the wheel on the stub axle in the usual way, while a brake drum 15 is secured to the wheel hub 16 and a brake band 17 is supported and guided by the pin 18 which is carried by the sub-bracket 19 which is part of the stub axle part 4.

The radius rod 20 takes the brake torque from its attachment to the brake band bracket 21 to the body wheel housing 11, where the same is indentured for the wheel at 22. A pull rod 23 to set the brake leads through the torque arm or rod 20 to the operator's foot or hand control, while the slot 24 permits the band to slip sufficiently on the pin 18 to place all the torque directly into the tube 20 so that no brake stress interferes with the up and down movement of the guides in the guide housings 12.

The stub axle also carries arms 25 which, together with arms 26 rigid with the bracket 3, supports the body resiliently through the special rubber cords 27: These rubber cords are composed of pure rubber bands 28 (see Figs. 23 and 24) which are held in a state of tension by a web fabric 29, so that any desired strength of initial tension can be had for my type suspension. The web expands with the rubber by the well known expansion of the web fabric through separation of the threads, but the rubbers are stretched so much more than the fabric proportionately that the threads contract and hold the rubber in a constant state of tension, thus enabling a relatively small amount of rubber to take a given load in tension with less elongation than it would have if it were not for the covering web holding it.

The arm 25 also has a sheet metal strap attached to it which passes under a bent up portion of a strip of spring steel 31 the two ends of which pass loosely within attachments 32 on the brake band 17, in order to keep same centered upon the brake drum 15.

Figure 5:
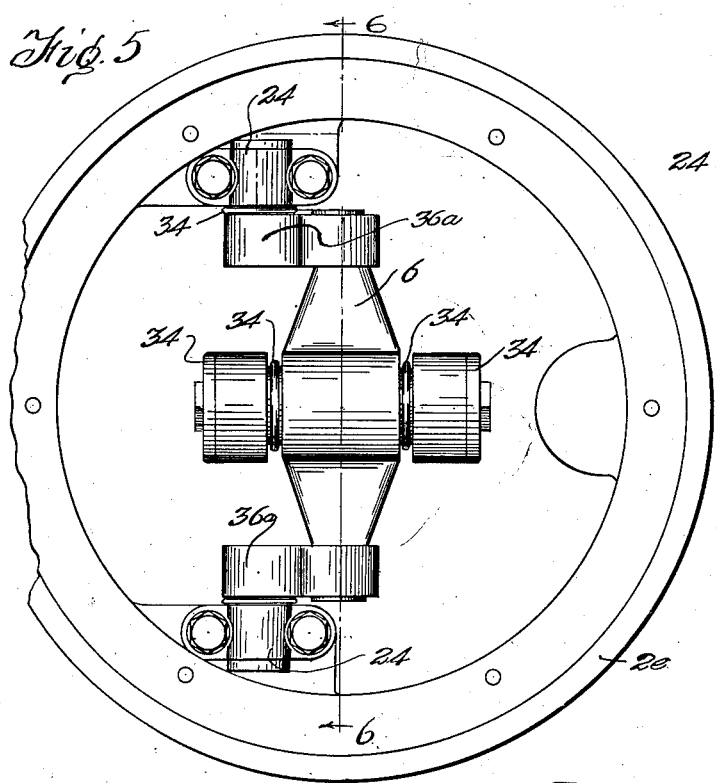
Figure 6:
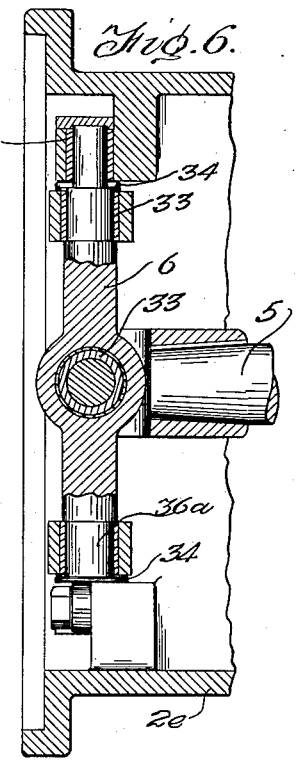
Figure 7:
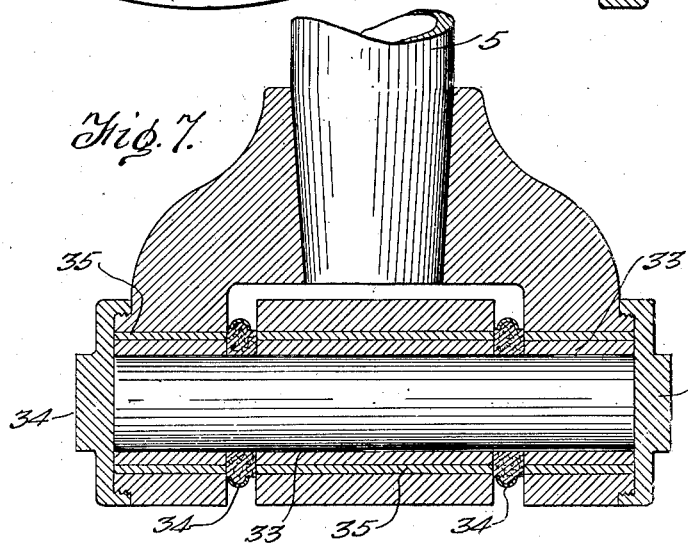

The universal joint shown in Figs. 5, 6 and 7 is well adapted for use where there is not much space available in the direction of the axis of rotation, but plenty of space radially. It also is simpler than most universal joints in respect of having an oil impregnated bearing 33 entirely inclosed within dust caps 34 and a comparatively soft material 35; and having off-set bushings 36a, the joint itself allows considerable end play for the shaft 5 so that the usual splined shaft may be dispensed with: It should be noted however that only one of the end play joints should be used with each shaft and the joint at the center of shaft 5 (see Fig. 25) is similar to joint 6 in general design, but lacks the end play feature and is designated 6'. As the oil impregnated bearings are very brittle the softer material 35 cushions jars and saves the bearings from cracking.

The forward part of the lower body portion 1 is rigidly secured to a cross bar 37 which has a guide bracket 38 secured at each end. Each guide bracket is forked and the ends of the forked portions are tubular as at 39, Fig. 13; within the said end 39 is press fitted an oil impregnated bearing 36 having a flange indicated at 36'. Within the bearing 36 is journalled a tube 40 which has a slot from its bottom up to the bottom of 39. A groove 41 is cut into the outer wall of the tube 40 and a ring 42 similar to a piston ring is held in the groove by set screws.

Figure 12:
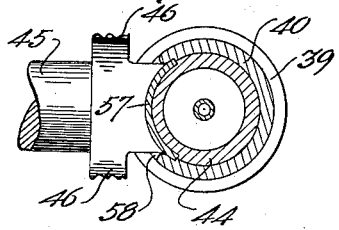

The cap 43 is threaded into the inside of the guide tube 40. Inside of the guide tube 40 is the elongated head or guide 44, shown in cross section in Fig. 12, this is a rigid part of the spindle 45 which carries the roller bearings for the front steering wheel: On either side of the spindle where it joins the vertically elongated head are two arms 46 adapted to support and protect rubber bands of the type described heretofore in Figs. 23 and 24. At the upper end of each arm is a tapered holder 47 having an open slot at 48 and into this holder is fitted a metal clamp 49 which securely holds the ends of the rubbers 28 and their web cover 29.

Figure 10:
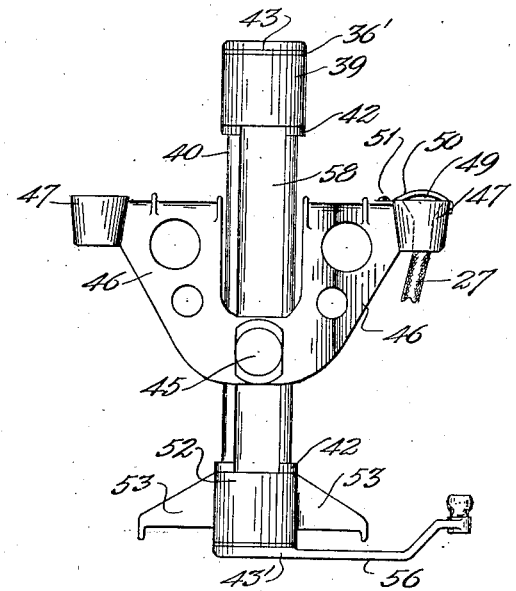
Figure 11:
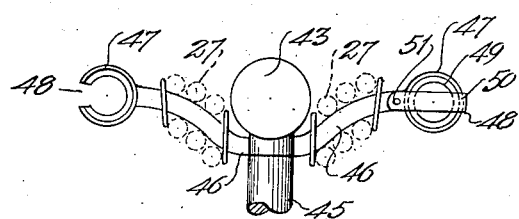

This metal clamp designated 49, is also tapered to correspond with the holder 47 and is further held in place by a spring 50 which turns about the tap screw 51. It will be obvious that there are many substitutes for the metal clamp, for example a piece of hard rubber could be vulcanized to the ends of the rubber threads and to the web fabric; the important thing being to hold all the ends of the rubber threads and the fabric cover in a compact and convenient manner so that anyone can quickly alter the rubber cords on a wheel and have a thickened knot or end of the cord and a socket or holder to receive same, as shown in Figs. 10 and 11.

Figure 9:
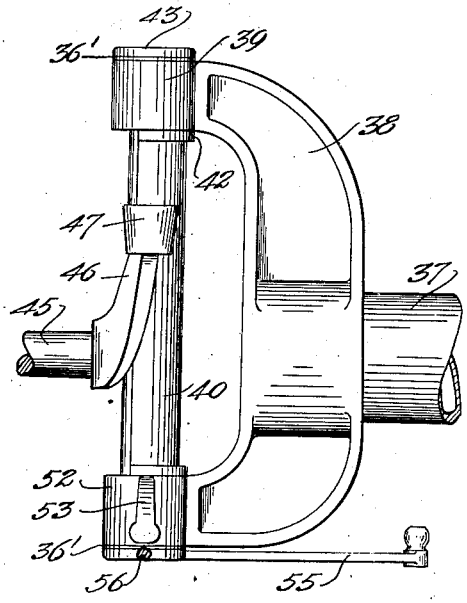
Figure 13:
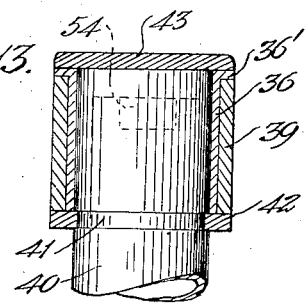

The lower member of the forked bracket 38 is designated 52 and carries similar parts to those shown in Fig. 13 inverted, also arms 53. As the rubber cords 27 are carefully fabricated as heretofore described with just sufficient tension built into them to support the static load of the vehicle with a shortened elongation, they can be placed upon the arms 42 and 53 by an entirely inexperienced person, and when the wheel is jacked up, so that the static load of the vehicle is taken off the spindle 45 and the spindle is down against the member 52 the cords 27 may be placed in position by hand so that they take up the positions indicated in Figs. 10 and 11 without the necessity of putting tension into the cords by hand, but the cords will nevertheless have tension in them by reason of their outer covering 29 holding a permanent tension in the bands 28. When the jack is removed and the static load is communicated through the cords from arms 53 to arms 46 the spindle 45 will take the position shown in Figs. 9 and 10, leaving the distance from 45 to 39 for down movement of the body relative the wheel and spindle and the distance 45 to 52 as rebound movement. A soft rubber stop 54 is secured to the inside of cap 43. A steering arm 55 is integral with the lower cap 43', which is firmly secured to the guide tube 40, also a tie rod arm 56 is part of this lower cap 43'. A sliding plate 57, Fig. 12, closes the slot 58 against ingress of dirt as more fully explained elsewhere.

It will thus be seen that the stub axle spindle is guided for vertical movement within the guide tube 40, resiliently-supporting the vehicle weight through the cords 27 on the arms 46 and that the steering arm 55 can turn the guide tube 40 within the oil bearings 36.

Figs. 14 and 15 exemplify one application of my invention to the rear guides 12, these are held between the forks of the bracket 3, see Fig. 1, between the caps 43a and the inset rings 42'. Unlike the front guide tubes the rear do not turn and therefore require no bushings. Inside each guide tube 12 is a vertically elongated part 59 rigidly connected to the stub axle 4 through the vertically oblong neck 4' extending through the slot 12' which is closed against ingress of dirt by the sliding plate 60 which slides in the groove 61 and is pulled down by the lip 62 in the top of guide 59. The plate 60 is pressed into its upward position by contact with neck 4' and similar parts close the slot below 4'; it being understood that the drawings Figs. 14 and 15 explain the method of closing the slots rather than showing accurate proportions of guide and tube relative the vertical movement.

The guide 59 has a funnel shaped lower end 59' which fits over a similar shape on the upper side of cap 43b and a small tube 59a extends from 59' to a V shaped top 59b, so that if oil is contained within the chamber 12a every rebound action of the stub axle 4 will pump oil to the upper inside wall of guide tube 12 through apertures 59c. The forked ends of bracket 3 are ribbed on the insides as at 3 for strength and to leave the outside clear for the brake lever.

Returning to Fig. 3 a light band 26' is permanently secured at 26a and detachably secured at 26b in order to prevent the rubber cords 27 from jumping off the arms 26 on rebound. The broken arc of a circle X described under the guides 12 in Fig. 3, represents how the entire shock absorber may be placed within a brake drum of conventional pattern and still have a considerable vertical travel: The sectioned view on the right hand of Fig. 2 shows a preferred form of brake drum 15' which like the drum 15 shown in Fig. 1 is attached to a flange of the wheel hub 16, but instead of being of small diameter and narrow rim like 15 the brake drum may be of such diameter as that shown in Figs. 2 and 3, in which case the arms 26 are upwardly turned toward their ends in order to avoid striking the inside of the brake drum on their down movement: The upper arms 25 are also stepped upwardly to correspond with the lower arms in order that the tension on the rubber cords 27 shall be even and they will not surge over the arms, see Fig. 44. The sectioned parts 15' 17' etc. on right hand of Fig. 2 have for convenience been revolved through 90 degrees from where they belong, i. e. they should be directly over the center of 19 of Fig. 2; having this in mind, it will be understood that the brake drum and band 15' and 17' represent together with the operating mechanism a typical brake mechanism of conventional pattern with the following exceptions:—

Whereas the bent plate 18' which carries the conventional brake operating rod and spring through the aperture 24' of part 21' is usually attached to a disc or plate 19' which is secured to the rear drive housing of conventional automobiles, in my construction 19' is secured to the sub-bracket 19, and in place of taking the brake torque through the rear drive housing I attach one of the brake band 17' operating fittings to a torque radius tube after the manner disclosed in Figs. 1, and 22, and instead of operating the brake band by a lever from the aforesaid plate on the rear drive housing I operate my brake mechanism by a rod leading through a point adjacent to the pivot which attaches the brake radius tube to the body after the manner shown at 20' of Fig. 22. This causes the brake operating mechanism to be independent of the relative positions of wheel and body.

63 of Fig. 25 indicates a drive shaft from the conventional type power unit and transmission located under the conventional auto hood in the front of a car: The shaft which I use requires no universal joints because it is held in alignment between its forward bearings and its rear bearing denoted 64 by the reinforced lower body portion already described. It is understood that the housing 65 is rigidly secured to the lower body portion by suitable lugs, not shown, and is directly braced by the body floor 9 and by fore and aft reinforcements of the lower body portion such as shown in Fig. 16, as 9a and 9b. The housing 65 is located directly under the passenger seat and, as it has no motion relative to the body parts can be placed against the bottom of the seat to save space. The bottom of the body, shown as 10 in Fig. 1 completely separates the rear drive housing 65 from the road.

This rear housing incloses and supports a rear drive mechanism within an oil tight chamber, but the mechanism in design and in function is quite different from the conventional type differerential drive which functions properly only on turns. As the present mechanism is intended to remedy the faults of the present type differential I may as well describe the most outstanding of these faults: Most of the time an automobile proceeds along its course without turning and during this time the differential mechanism has no other than a detrimental function, adding weight and complication to the vehicle while depriving it of proper traction: This is most noticeable in attempts to climb a slippery hill or to make progress in deep sand, then if one wheel has good ground under it the differential makes such good traction useless by delivering all the motor power to the wheel which has little or no traction. Also when the vehicle is making high speed and one wheel after the other alternatively leaves the ground due to inequalities in the road the differential tends to speed up the free wheel and slow down the wheel which should be driving; this action not only causes loss of power, but wears out the tires. In addition to remedying the above and other faults my invention greatly facilitates altering gear ratios with sliding type transmissions and saves much gasoline through automatic coasting.

Figure 8:
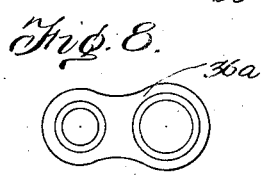

64' is the usual oil tight dust washer and the shaft 63 drives the crown wheel 66 through the bevel gear 63', this crown wheel is rigidly secured to a pilot shaft 66' indicated in Fig. 25 by dotted lines. Also rigidly secured to the shaft 66' is the drive wheel 67 containing slots or apertures 67' into which are fitted alternately forwardly driving teeth 67a and rearwardly driving teeth 67b; this wheel also carries two pins 67c which extend into curved slots 68b in the wheel 68 which has a sleeve bearing 68' about the shaft 66' and slots 68c and 68a: This wheel also carries a braking device 70 journalled to turn about an axis transverse to the lugs 71 and normally, that is when the rear wheels are stopped or going very slowly, the small spring 70' keeps one end of the said brake 70 against an internal brake band 72, but when the wheel 68 rotates at any speed the weights on the opposite ends of the brakes 70 act by centrifugal force to counteract the spring and to completely relieve the brake action. A third or driven wheel 69 has a sleeve bearing about the pilot shaft 66' and on the outer end of this sleeve is attached in any suitable manner a universal joint 6' similar in all respects to the joint disclosed in Figs. 5, 6 and 7 and 1 excepting that the off-set end bearing shown in Figs. 5 and 8 for end play is absent. Brake drums 73 for the emergency brake are also rigidly attached to the wheel 69 and a spring 68d tends to hold the wheel 68 tightly against the wheel 67. For the operation please see diagrammatic Figs. 29, 30, 31 and 32. All parts in the housing 65 operate in an oil bath.

Starting with the car at rest and driving shaft 63 for the forward movement of the car, the forward end of the crown wheel in Fig. 25 is driven downwardly, but this drives the wheel 67 in the same direction through the pilot shaft 66'. The views shown in Figs. 26 to 31 inclusive are those one would see if looking from the center of the crown wheel 66 toward the right hand portion of the rear drive; arrows indicate in Figs. 26, 27 and 28 the relative positions of the parts corresponding with the forward driving relationship represented by Fig. 29 and particular attention is called to the line z—z of these figures.

Looking now at Figs. 25, 26 and 27 it will be seen that the brake 70 held against brake material 72 by springs 70' will prevent wheel 68 from rotating with wheel 67 until the pins 67c in wheel 67 engage the ends of slots 68b in wheel 68, but this lag will cause the non-slotted portion of wheel 68 to lag relative wheel 67, see Fig. 29 and the rounded edge of this non-slotted part engaging the inclined surface of the tooth 67a will force this tooth and all corresponding and alternate teeth (see Fig. 27 in which the slots for the a and b teeth are indicated) into the four slots 69' of driven wheel 69, but this will drive the vehicle wheel on the right side through joint 6', shaft 5, joint 6 etc. and, as the left side drive mechanism is similar wheel 2 will be driven positively ahead, thus we shall have a positive two wheel drive forward on both wheels obviating the slipping of one wheel in snow or sand. While the vehicle is thus driving should it turn a corner the wheel describing the larger circle is free to over-run the other since the rounded edge of the slots in wheel 69, see Fig. 29, will force the tooth 67a, against the spring 68d, back into a disengaged position illustrated in Fig. 31; also should the car be going down a grade so that motor power is not required both wheels may freely over-run the motor, thus saving gasoline and leaving the shaft 63 free from the rear wheel actuation which results from the ordinary differential the changing of gears in the sliding gear type transmission becomes a very simple and easy matter.

To reverse the direction of travel the shaft 63 and crown wheel 66 are driven in the reverse direction as shown in Fig. 30 and the brakes 70 again cause the wheel 68 to lag thus forcing the teeth 67b into driving relationship in place of 67a which gives the car a positive two wheel rear drive, but allows either or both wheels to over-run.

It will be seen that brake bands of conventional pattern and operation such as shown in Fig. 16 will act as emergency brakes in addition to the wheel radius tube brakes shown in Figs. 1, 2, 3 and 22.

Looking now, at Figs. 33 to 42 inclusive and 44 we see a preferred form of the invention as relates to the internally arranged guide and steering arms as well as to a method of keeping the same inclosed against dust etc.

The wheel spindle 45, Fig. 33, carries a typical demountable wheel 2a on a typical ball bearing hub 75; this spindle enters the slot 58 in the guide tube 40, Figs. 34, 36 and 37, and forms an elongated vertical head 45' which is hogged out to fit the steel square 74 with its externally fitted oil impregnated bushing 74'. The top of the square tube 74 has a steel plug press fitted into it with its top turned to fit into a bearing hole drilled into top cap 43 at 43a, while the bottom of the square tube 74 with its external bearing surface 74' fits snugly within a square indenture 43b in the lower cap 43': A soft rubber bumper 54a fits about the upper and lower extremities of 74'. The arms 46 are carried from the spindle 45 where it enters the slot 58 to the positions shown in Fig. 34 where they hold the rubber cords 27 indicated by dotted lines. It will be noticed that these arms clear the ends 39 of bracket 38 in relative vertical movement. Thus the steering arm 55 directly controls the steering position of the steering spindle 45 through the square guide 74 while the said spindle is free excepting for the rubber cords to move vertically upon the oil bearing 74'. A clearance 40' will be observed between the head 45' and the inside wall of the tube 40. The bearing for steering purposes is the oil impregnated bushing 36 which is press fitted into 39 and retained in place by inset rings 42.

To close the slot 58 I employ a small case 76, filled with copper or brass plates 77; this case is located in slots 76' within the slot in the tube 40; one case of plates is used above and another below the spindle 45: Each plate 77 is guided for vertical movement within grooves in the ends 76b of the case 76, these extend from bottom to top of the slot 58, while the back of the case 76a extends only the length of 39.

Plate 77c is secured to 45 as indicated in Fig. 41. Each plate has punched lips 78 which tend to spring outwardly a distance sufficient to engage within the edges of punched slots 79 in the next plate, so that when plate 77c is pulled down a certain distance its lips 78 on both sides engage the slots 79 of the next plate 77b and in turn 77b pulls down 77a etc. and when 45 is down to its lowest point touching 52 the last plate at the top 77 has its lip 78 engage the lower edge of the back of the case 76a in a slot like 79. When the plates are pressed upwardly the lips 78 are pressed into their own plate so that the plates telescope alongside each other: It will be understood that the lower set of plates operate in a similar manner. By this arrangement of guides and steering arm and tie rod arm I have obviated the anomalous condition found in conventional practice where the wheels are turned by an extreme shock absorber movement and instead of the steering arms and cross tie rod 56' being unsprung weight and requiring clearance for relative movement with the body these are now entirely sprung and move with the body requiring no room for clearance. It will be understood that the tie rod (not shown) connects the steering wheels by means of the tie rod arm 56.

In Fig. 16 it will be noticed that I have improved my original disclosure of 1925, by carrying the short shafts 38d through from one brake drum to the other: In my present disclosure this shaft 38d forms an aligning support for the differential gears such as I disclosed in my Patent No. 1,682,297, and the gears 37d have sleeves 37e which are free to rotate about the said shaft 38d; these sleeves carry the brake drums and universal joints. The other numerals of Fig. 16 indicate similar parts to those already described.

The view of the cord in Fig. 24 shows the rubber bands under tension and bound tightly together as they are wrapped by the threads 29 (a simple braiding machine can be used much after the fashion of the May pole ribbons); also in Figs. 3, 33, 42 and 44 the rubber cords are shown under tension carrying the static load of a vehicle: When the tension on the cords is relaxed by jacking up the weight from the wheel, the threads of the web fabric 29 come tightly together and are held so by the tension of the rubber bands within them. Obviously there will be a wide application of my invention to other than auto wheels, such for example as aeroplane wheels and I do not care to restrict to the precise form shown.

Having thus described my invention and explicated its modus operandi, what I claim is:—

1. In combination with the ground wheel of a vehicle two non-rotatable parts guided upon each other for vertical movement, arms extending approximately at right angles to the wheel axis from the said parts and rubber bands resisting the separation of the said arms, the lower of the said arms being bent upwardly so that the point of attachment of the outer band on said arm is higher than the corresponding point for the inner band.

2. A combination in accord with claim 1 and the arm on the other said part being bent upwardly in the same general direction as the lower said arm.

3. In an automobile the combination with an independently sprung road wheel of a forked bracket holding a vertical guide journalled to turn within the upper and lower of the said forks, a stub axle for the said wheel having a part extending as a guide within the first said guide and a tie-rod arm moving vertically with the first said guide and turning it in the said forked journals to steer the said wheel.

4. In combination with a vehicle body, a bracket rigid therewith, a vertically disposed cylindrical part journalled to turn in a horizontal plane, a vertically elongated guide moving vertically within the said part and carrying a wheel spindle through a slot in said part, the said slot being closed against ingress of dirt while permitting vertical movement of the said spindle.

5. In combination with a vehicle body and ground wheel, a bracket intervening between the said body and wheel and having two vertically elongated cylindrical guides rigid with the said body and each inclosing and guiding stub axle guide extensions for relative vertical movement therein while holding the said wheel in a desired rotational plane and the said movable parts completely surrounded and closed by metal for protection against dirt and forming an air cushion therebetween to absorb road shocks.

6. In an automobile having a steering road wheel mounted upon a stub axle part and said part resiliently supported and guided by a vertically elongated external guide part which completely incloses the guide portions of the said axle part, the said guide part being journalled to turn in a bracket rigid with the sprung portions of the said automobile.

7. In combination with a vehicle having independently sprung wheels by means of non-rotative stub axle parts guided for vertical movement by a bracket rigid with the sprung portion of the said vehicle, a brake drum attached to one of the said wheels, a brake band and operating mechanism carried by one of the said stub axle parts and a combined tension and compression radius tube transmitting the brake torque to a journalled attachment of the said sprung portion of the said vehicle.

8. In combination with an automobile having its road drive wheels independently sprung by guide brackets holding the said wheels for yieldable vertical movement, two vertically elongated and spaced apart guides rigid with the sprung portion of the said automobile, a slot in each said guide and a stub axle part having two guide portions, one extending through each said slot and means attached to each said portion to close the said slots against ingress of dirt, and a drive shaft passing between the first said guides to drive one of said wheels.

9. In combination with the vertically yieldable guide bracket intervening between a vehicle and one of its road wheels, a vertically elongated guide part moving vertically with the said vehicle and surrounding and inclosing a stub axle guide member, the said member entering the said part through a slot in the side of same facing the said wheel.

10. In combination with the vertical guide bracket for a vehicle steering road wheel, an external guide part journalled to turn in the said bracket and moving vertically with the sprung portions of said vehicle, a steering tie rod arm rigid with the said journalled part, a slot in the said part facing the said wheel and a stub axle part carrying the said wheel and holding it through the said slot in yieldable vertical movement and in steering positions corresponding to steering movements of the said tie rod arm.

11. A combination according to claim 9 and means to close the said slot and seal same against ingress of dirt while permitting vertical movement of the said member therein.

12. A combination according to claim 9 and the said part journalled to turn for wheel steering in bearings forming its connection with the said vehicle.

13. In combination with a guide bracket rigid with the lower portion of a vehicle, a stub axle part guided for vertical yieldable movement by said bracket, a wheel, carrying a brake drum, rotatably mounted on the said part and a braking mechanism for controlled contact with the said drum, the weight of the said mechanism being carried by the said stub axle part and the brake torque taken, by means of a radius rod, to a journalled attachment of said rod to the said vehicle.

14. In combination with individual wheel springing for a vehicle, two non-rotative parts guided upon each other for yieldable vertical movement and one of the said parts rigid with the body portion of the said vehicle, the other of said parts carrying a stub axle for the vehicle wheel, a brake drum on the said wheel and a brake band for operative contact with the said drum and an arm leading from the said stub axle part to the said band to hold the same in guided relationship to the said drum.

15. In combination with braking means for an individually sprung vehicle wheel, a radius tube journalled to a sprung portion of the vehicle and a brake operating means passing through a guide located adjacent the said journalled axis.

16. In combination with a vertically guided stub axle for a vehicle wheel, a brake drum rigid with said wheel and brake operating mechanism carried by a part attached to the said stub axle, the said part permitting a limited horizontal movement of the said mechanism.

17. In combination with rubber suspension for a vehicle, a bracket having vertically moving parts, a ground wheel and a brake drum rotating on a stub axle of one of the said parts and loops of rubber resisting the separation of the said parts, the two said parts and the rubber loops located within the said brake drum.

18. In combination with the suspension of a road vehicle, a body bracket part, a stub-axle part and elastic means intervening in a substantially vertical plane between attachments for said elastic means located on each said part and means for locking the first said means on each said part, said locking means adapted to hold the said elastic means against movement in opposite directions.

19. In combination with a body and road wheel of an automobile a body bracket part and stub-axle part guiding the said body and wheel for relative vertical movement, an elastic member extending in a substantially vertical plane between the said parts and one end of the said elastic member secured to a metal end portion as an integral part thereof, the said end shaped to form a ready attachment with one of the first said parts and means to lock the said end to one of the said parts.

JAMES V. MARTIN.